United States Patent Office 3,251,856
Patented May 17, 1966

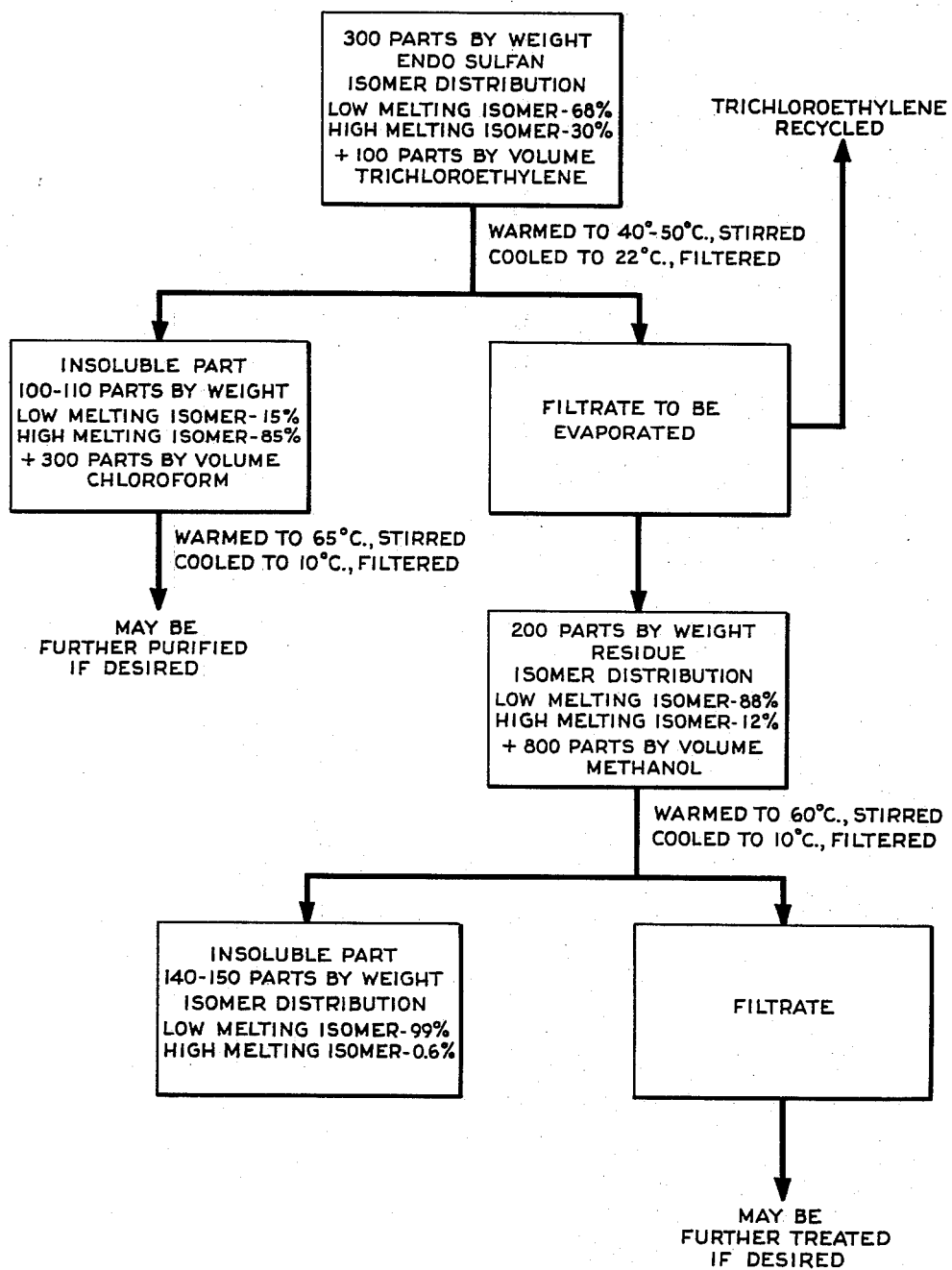

3,251,856
PROCESS FOR THE SEPARATION OF 6,7,8,9,10,10-HEXACHLORO - 1,5,5a,6,9,9a - HEXAHYDRO-6,9-METHANO - 2,4,3 - BENZODIOXATHIEPIN-3-OXIDE ISOMERS
Hans L. Schlichting, Grand Island, N.Y., assignor to Hooker Chemical Corporation, Niagara Falls, N.Y., a corporation of New York
Filed Nov. 30, 1962, Ser. No. 241,211
6 Claims. (Cl. 260—327)

This invention relates to a process for the treatment of 6,7,8,9,10,10 - hexachloro - 1,5,5a,6,9,9a - hexahydro-6,9-methano-2,4,3-benzodioxathiepin-3-oxide and more particularly it relates to a process for separating the two isomers of 6,7,8,9,10,10 - hexachloro-1,5,5a,6,9,9a-hexahydro-6,9-methano-2,4,3-benzodioxathiepin-3-oxide.

For purposes of brevity, the term "endosulfan" is used throughout the description to indicate the compound 6,7,8,9,10,10 - hexachloro - 1,5,5a,6,9,9a - hexahydro-6,9-methano-2,4,3-benzodioxathiepin-3-oxide, in both isomeric forms.

The endosulfan may be represented structurally as follows:

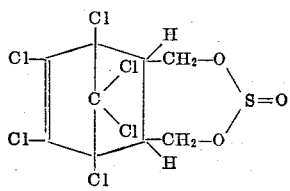

Endosulfan may be prepared as illustrated in United States Patent 2,983,732.

The endosulfan differs markedly from other chlorinated Diels-Alder type compounds in that it contains a sulfite ring. This sulfite group has a stable, non-planar structure similar to a flattened tetrahedron with the sulfur atom positioned at the apex of the tetrahedron. The existence of isomers of endosulfan is disclosed in U.S. Patent 2,799,685. As indicated in column 1 and column 2, endosulfan may exist in the form of a mixture of isomers from which the pure isomers melting at 108 degrees to 110 degrees centigrade and 208 degrees to 210 degrees centigrade can be isolated from a solution in petroleum ether by fractional crystallization. The disadvantage of this process resides in the inconvenience caused by the repeated fractional crystallizations required and the low yields of product obtained. Further, large volumes of petroleum ether are used due to the poor solubility of endosulfan in this solvent. Normally, this process involves dissolving 10 parts by weight of endosulfan in 360 parts by volume of boiling petroleum ether. On cooling 2 parts by weight of the high melting isomer having a purity of about 90–95 percent, and 3 parts by weight of the low melting isomer having a purity of 85–90 percent are recovered. Further recrystallization of the low melting isomer results in yielding 1 part by weight of the low melting isomer having a purity of about 99 percent.

It is an object of this invention to provide a method for conveniently and economically separating the two isomers of endosulfan.

Another object of this invention is the utilization of lesser quantities of solvent, thereby simplifying the process, reducing the cost and decreasing the hazards of the operation.

These and other objects will become apparent from the detailed description given herein.

The drawing which is attached hereto is a flow diagram of the preferred process of the present invention.

The novel process of the instant invention is accomplished by contacting endosulfan with a solvent capable of effecting solution of the low melting isomer and recovering the desired products.

The pure isomers thus obtained have differing periods of persistence when applied as insecticides on crops and, therefore, are most suitable for differing applications, depending on whether long or short persistence is desired. It is especially important that the low melting isomer should be substantially free of the high melting, more residual isomer in some applications, otherwise intolerable insecticide residues may remain on the treated crops after harvesting. Because the high melting isomer is more stable than the low melting isomer and more stable than endosulfan, there will be certain applications for this isomer where a highly effective, long lasting insecticide is required. On the other hand, the low melting isomer is more volatile than the high melting isomer when it is desirable to have the insecticide volatilize comparatively quickly. For example, when it appears desirable under certain circumstances to apply a highly effective insecticide on agricultural crops shortly before harvest time, the low melting isomer meets the qualification of having high insecticidal activity and at the same time is volatile enough to be gone by harvest time or to be decomposed to non-toxic degradation products a very short time after application.

More specifically, the process of the instant invention involves treating endosulfan which contains on the average of about one-third of a high melting isomer, melting point around 210 degrees centigrade, and two-thirds of a low melting isomer, melting point about 108 degrees centigrade with a halogenated solvent, e.g., a chlorinated hydrocarbon containing at least one hydrogen which solvent is capable of preferentially dissolving the lower melting isomer. The mixture is stirred until solution equilibrium is substantially accomplished. The insoluble solid composition remaining is then separated from the filtrate by any convenient method (e.g., filtration, centrifugation, decantation).

The process up to this point will be designated hereinafter as the first stage.

The filtrate is evaporated to dryness and residue is contacted with a suitable solvent. Heat may conveniently be employed at this phase to effect solution more rapidly. After cooling, another separation is employed and the insoluble part which is obtained contains 98–100 percent of the low melting isomer. Hereinafter these steps will be designated as the second stage. Further, if desired, although it is not necessary, the filtrate obtained from this second stage may be evaporated to dryness, yielding a minor amount of isomer mixture generally with about the same isomer distribution as the starting material and it may be recycled back to the input of the first stage or combined with a mixed commercial grade of endosulfan.

The insoluble material resulting from the initial separation contains about 80 to about 90 percent of the high melting isomer and further purification will result in producing a product containing more than about 99 percent of the high melting isomer.

Any purification procedure accomplishing the desired results can be utilized without departing from the scope of the instant invention. Illustrative examples include, recrystallization, chromatography (gas and column) vacuum distillation, and the like.

Illustrative examples of halogenated hydrocarbons, usually of 1 to 5 carbon atoms, which may be utilized in the first stage of this invention include trichloroethylene, chloroform, methylene chloride, 1,1-dichloroethane, 1,2-dichloroethane, tetrachloroethane, propylene dichloride, dichloropentane, and the like. Suitable other halogenated solvents, e.g., bromo analogues, also find use.

Illustrative examples of the solvents utilized to effect purification of the low melting isomer in the second stage include aliphatic solvents, alcohols, preferably an aliphatic alcohol of 1 to 5 carbon atoms. The preferred alcohols employed include methanol, isopropanol, n-propanol, isobutanol, n-butanol, secondary butanol, and other lower alkanols, preferably of 1 to 5 carbon atoms. Other solvents acting in the manner described herein may also be utilized without departing from the invention.

During or before the crystallization of the purified isomers, stabilizers such as epichlorohydrin, formamide, etc., may be added to the formulation to avoid any decomposition if desired, although this is usually not necessary.

Further, heat may be employed either to conveniently effect solution during the initial step or to effect solution during the crystallization. The temperature employed depends on the solvent utilized. Temperatures up to the boiling points of the solvents are operative.

Pressures employed in the process of the instant invention are conveniently atmospheric although super or sub atmospheric pressures may be employed without departing from the scope of the instant invention.

Referring to the drawing (FIGURE 1), this is a flow diagram of the preferred process of the present invention. As is indicated in the drawing, 300 parts by weight of endosulfan containing an isometric distribution in the ratio of 68 parts of the low melting isomer to 30 parts of the high melting isomer, as determined by infrared analysis, was mixed with 100 parts by volume of trichloroethylene. The mixture was heated to about 45 degrees centigrade to effect solution more rapidly and was then cooled to room temperature which was about 22 degrees centigrade in the instant example. The insoluble part was then separated from the soluble part by any convenient method. After the filtrate was evaporated to dryness, 200 parts by weight of endosulfan remained with an isomer distribution in the ratio of 88 parts of low melting isomer to 12 parts of high melting isomer, as determined by infrared analysis. This residue was mixed with 800 parts by volume of methanol and was warmed to about the boiling point of the solvent to effect solution more conveniently. The solution was then cooled to about 10 degrees centigrade and the insoluble part was separated from the soluble part by any convenient method. The insoluble part contains 140–150 parts by weight of material having an isomer distribution of 99 percent low melting isomer and 0.6 percent of high melting isomer. The filtrate was evaporated and the solvent may be recycled as indicated. The remaining residue, which contains 50–60 parts by weight of material having an isomer distribution of 70 percent low melting isomer to 30 percent high melting isomer, as determined by infrared analysis, can either be recycled as indicated or can be utilized as is. Further, the trichloroethylene employed in the first stage of the process can be recycled and utilized again.

The percentages of high and low melting isomer present in endosulfan was determined by infrared analysis by measuring the intensity of the band for the low melting isomer at 17.3 microns and the intensity of the band for the high melting isomer at 15.73 microns. A KBr prism, a cell of .68 millimeter thickness and carbon disulfide as the medium, were employed.

The following examples serve to illustrate the invention but they are not intended to limit it thereto.

*Example 1*

300 g. of endosulfan was mixed and stirred with 100 ml. trichloroethylene. The mixture was warmed up to about 45 degrees centigrade then cooled down to room temperature (23 degrees centigrade) and filtered. 110 g. remained as insoluble filter residue, having a melting point of 150–160 degrees centigrade, and an isomer distribution of 19 percent low melting isomer and 81 percent high melting isomer. A recrystallization using 50 milliliters of carbon tetrachloride yielded 70 grams high melting isomer of a melting point of 210 degrees centigrade.

The trichloroethylene filtrate was evaporated to dryness yielding 190 grams of dry residue. This residue was dissolved in 600 ml. hot methanol of a temperature of about 58–62 degrees centigrade. On cooling, precipitation occurred. As soon as 20 degrees centigrade was reached, the solution was filtered. The insoluble filter residue (140 g., M.P. of 107–108 degrees centigrade) consists of 99 percent low melting isomer and 1 percent high melting isomer. Evaporating the filtrate to dryness, 50 grams of residue were obtained, consisting of 70 percent low melting isomer and 30 percent high melting isomer.

*Example 2*

As described in Example 1, 200 grams endosulfan were mixed with 100 ml. of trichloroethylene, warmed and cooled to 25 degrees centigrade. 100 grams remained soluble, being 86 percent high melting isomer, M.P. of 180–200 degrees centigrade. A recrystallization from 40 ml. perchloroethylene yielded 83 grams of a 100 percent high melting isomer, M.P. 210 degrees centigrade.

The trichloroethylene filtrate was evaporated to dryness yielding 200 grams dry residue, consisting of 87 percent low melting isomer and 13 percent high melting isomer. This residue was dissolved in 800 ml. hot (60 degrees centigrade) n-propanol. On cooling to 10 degrees centigrade a precipitation occurred. The precipitate was filtered off and was found to be 99.5 percent low melting isomer (145 g.). The filtrate was evaporated to dryness. The residue (55 grams) was 69 percent of low melting isomer and 31 percent of high melting isomer.

*Example 3*

As described in Example 1, 300 grams of endosulfan were mixed with 100 ml. of chloroform. The mixture was then heated to about the boiling point of chloroform, and was cooled to about 20 degrees centigrade. Ninety grams of insoluble solid material containing about 86 percent of high melting isomer, melting point from between about 180 degrees centigrade to about 200 degrees centigrade, were recovered. A recrystallization from 40 ml. of tetrachloroethylene yielded 70 grams of a product containing 99 percent of the high melting isomer, melting point 210 degrees centigrade.

The chloroform filtrate was evaporated to dryness. The residue weighed two hundred and ten grams and contained 82 percent of low melting isomer and 18 percent of high melting isomer. A recrystallization of this residue utilizing 100 milliliters of a suitable solvent resulted in the recovery of 160 grams of 99 percent purity low melting isomer, melting point 107 degrees centigrade to 108 degrees centigrade.

About 50 grams of endosulfan containing 70 percent of low melting isomer and 30 percent of high melting isomer were recovered by evaporating the filtrate to dryness.

*Example 4*

As described in Example 1, 300 grams of endosulfan were mixed with 100 milliliters of methylene chloride. The mixture was then heated to about the boiling point of methylene chloride followed by cooling to 10 degrees centigrade. Eighty (80) grams of insoluble solid material containing about 82 percent of high melting isomer of melting point from between about 180 degrees centigrade to about 200 degrees centigrade, were recovered. A recrystallization from 40 milliliters of carbon tetrachloride yielded 60 grams of a product containing 99 percent purity of the high melting isomer, melting point 210 degrees centigrade.

The carbon tetrachloride filtrate was evaporated to dryness. Twenty grams of dry residue resulted, containing 66 percent of low melting isomer and 34 percent of high melting isomer.

The methylene chloride filtrate from the initial separation step was also evaporated to dryness. Two hundred twenty (220) grams of dry residue containing 80 percent of low melting isomer and 20 percent of high melting isomer were recovered.

A recrystallization of this residue from 100 milliliters of solvent resulted in the recovery of 150 grams of a product containing low melting isomer of 99 percent purity.

About 70 grams of endosulfan containing 68 percent low melting isomer and 32 percent high melting isomer were recovered by evaporating the filtrate to dryness.

*Example 5*

A suspension of 300 grams of endosulfan and 100 milliliters of 1,2-dichloroethane was heated to about 80 degrees centigrade. The heated mixture was stirred vigorously for about 10 minutes. The mixture was then cooled to 10 degrees centigrade and filtered. The filter residue (80 grams) recovered contained 82 percent of the high melting isomer and 18 percent of the low melting isomer of endosulfan. A recrystallization from 40 milliliters of chloroform yielded 60 grams of the high melting isomer of over 99 percent purity with a melting point of 210 degrees centigrade.

About 20 grams of endosulfan containing 66 percent low melting isomer and 34 percent high melting isomer were recovered by evaporating the chloroform filtrate to dryness.

The 1,2-dichloroethane filtrate was also evaporated to dryness. Two hundred twenty (220) grams were recovered which on recrystallization from 500 milliliters of secondary butanol, in the presence of 1 gram of epichlorohydrin yielded a product containing 140–150 grams of the low melting isomer of better than 99 percent purity, with a melting point from between about 108 degrees centigrade and about 108.5 degrees centigrade.

The examples and methods of preparation disclosed have been given for purposes of illustration only and do not restrict the invention to the specifics herein illustrated. Many other modifications and ramifications will naturally suggest themselves to those skilled in the art, based on the disclosure of the basic discovery. These are intended to be comprehended within the scope of my invention.

What is claimed is:

1. A process for the treatment of mixed high and low melting isomers of 6,7,8,9,10,10-hexachloro-1,5,5a,6,9,9a-hexahydro - 6,9-methano-2,4,3-benzodioxathiepin-3-oxide which comprises (1) contacting said mixed isomers of 6,7,8,9,10,10 - hexachloro - 1,5,5a,6,9,9a - hexahydro-6,9-methano-2,4,3-benzodioxathiepin-3-oxide with a halogenated hydrocarbon solvent containing at least one hydrogen atom, and (2) separating a solution from the mixture in (1), said separated solution being comprised of a major proportion of the low melting isomer of 6,7,8,9,10,10 - hexachloro - 1,5,5a,6,9,9a - hexahydro-6,9-methano-2,4,3-benzodioxathiepin-3-oxide and a minor proportion of the high melting isomer of 6,7,8,9,10,10-hexachloro - 1,5,5a,6,9,9a - hexahydro-6,9-methano-2,4,3-benzodioxathiepin-3-oxide.

2. A process for separating the mixed high and low melting isomers of 6,7,8,9,10,10-hexachloro-1,5,5a,6,9,9a-hexahydro - 6,9-methano-2,4,3-benzodioxathiepin-3-oxide which comprises (1) contacting said mixed isomers of 6,7,8,9,10,10 - hexachloro - 1,5,5a,6,9,9a - hexahydro-6,9-methano-2,4,3-benzodioxathiepin-3-oxide with a halogenated hydrocarbon solvent containing 1 to 5 carbon atoms and at least one hydrogen atom, the mixture of said solvent and 6,7,8,9,10,10-hexachloro-1,5,5a,6,9,9a-hexahydro - 6,9-methano-2,4,3-benzodioxathiepin-3-oxide isomers being maintained at a temperature of from about 30 degrees centigrade to about 60 degrees centigrade, (2) cooling the mixture of (1) above and (3) separating a solution from the mixture of (1), said separated solution being comprised of at least 80 percent of the low melting isomer of 6,7,8,9,10,10-hexachloro-1,5,5a,6,9,9a-hexahydro-6,9-methano-2,4,3-benzodioxathiepin-3-oxide.

3. A process in accordance with claim 2 wherein the halogenated solvent is selected from the group consisting of trichloroethylene, chloroform, methylene chloride, 1,1-dichloroethane, 1,2,-dichloroethane, tetrachloroethane, propylene dichloride, and dichloropentane.

4. A process in accordance with claim 2 wherein the separated solution comprised of at least 80 percent of the low melting isomer of 6,7,8,9,10,10-hexachloro-1,5,5a,6,9,9a - hexahydro - 6,9-methano-2,4,3-benzodioxathiepin-3-oxide is subjected to further purification by crystallization from an aliphatic alcohol, to separate the low melting isomer of 6,7,8,9,10,10-hexachloro-1,5,5a,6,9,9a-hexahydro - 6,9 - methano-2,4,3-benzodioxathiepin-3-oxide in at least 99 percent purity.

5. A process in accordance with claim 4 wherein the crystallization is effected in the presence of an aliphatic alcohol containing from 1 to about 5 carbon atoms.

6. A process for the separation of the mixed high and low melting isomers of 6,7,8,9,10,10 - hexachloro-1,5,5a,9,9a - hexahydro - 6,9 - methano-2,4,3-benzodioxathiepin-3-oxide which comprises contacting such a mixture with trichloroethylene at a temperature from about 40 degrees centigrade to about 50 degrees centigrade, cooling the mixture of trichloroethylene and the higher and lower melting isomers of 6,7,8,9,10,10-hexachloro-1,5,5a,6,9,9a - hexahydro - 6,9-methano-2,4,3-benzodioxathiepin-3-oxide made to a temperature from about 20 degrees centigrade to about 25 degrees centigrade, separating an insoluble portion comprising about 85 percent of the high melting isomer of 6,7,8,9,10,10-hexachloro-1,5,5a,6,9,9a - hexahydro - 6,9,methano-2,4,3-benzodioxathiepin-3-oxide and about 15 percent of the low melting isomer of 6,7,8,9,10,10 - hexachloro - 1,5,5a,6,9,9a - hexahydro-6,9-methano-2,4,3-benzodioxathiepin-3-oxide and a solution portion which, when subjected to evaporation, results in a residue which comprises about 88 percent of the low melting isomer of 6,7,8,9,10,10-hexachloro-1,5,5a,6,9,9a - hexahydro - 6,9,methano-2,4,3-benzodioxathiepin-3-oxide and about 12 percent of the high melting isomer of 6,7,8,9,10,10-hexachloro-1,5,5a,6,9,9a-hexahydro-6,9,-methano-2,4,3-benzodioxathiepin-3-oxide, evaporating the solution to such a residue, and purifying said residue by crystallization from an aliphatic alcohol, to separate a crystallized low melting isomer of 6,7,8,9,10,10-hexacholo - 1,5,5a,6,9,9a - hexahydro - 6,9-methano-2,4,3-benzodioxathiepin-3-oxide of at least 99 percent purity.

References Cited by the Examiner

FOREIGN PATENTS 810,602   3/1959   Great Britain.

OTHER REFERENCES

Lindquist et al.: J. Economic Entomology, vol. 50 (1957) pp. 483–6.

Riemschneider et al.: Die Naturwissenschaften, vol. 48 (February 1961), pp. 130–1.

Weissberger (Ed.): Technique of Org. Chem., Interscience Pub. Inc., New York (1950), pp. 423–428, 471, 477 and 478.

JOHN D. RANDOLPH, *Acting Primary Examiner.*

NICHOLAS S. RIZZO, WALTER M. MODANCE, *Examiners.*